March 23, 1954  L. W. BURTON ET AL  2,673,324
ELECTRIC REGULATING APPARATUS
Filed Dec. 15, 1952
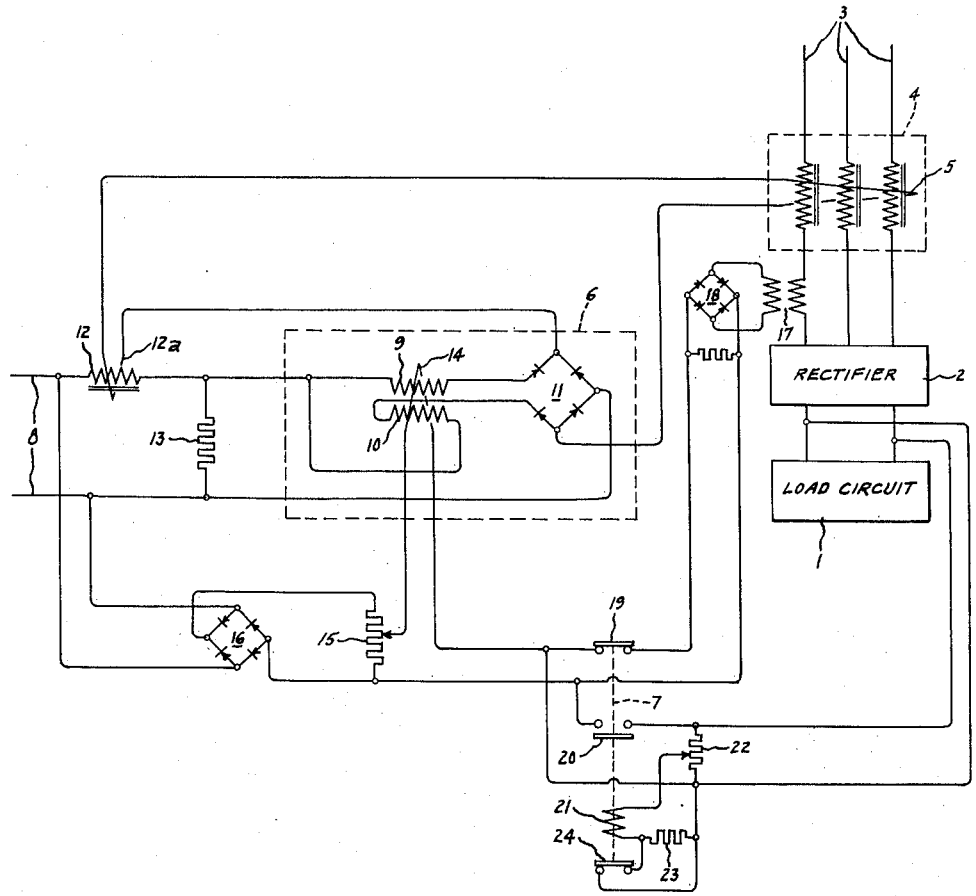
Inventors:
Lester W. Burton,
Stuart P. Jackson,
by　*Caule A. Nott*
Their Attorney.

Patented Mar. 23, 1954

2,673,324

UNITED STATES PATENT OFFICE 2,673,324

ELECTRIC REGULATING APPARATUS

Lester W. Burton, Danvers, and Stuart P. Jackson, Lynn, Mass., assignors to General Electric Company, a corporation of New York Application December 15, 1952, Serial No. 326,059

9 Claims. (Cl. 323—66)

Our invention relates to electric regulating and limiting apparatus, and more particularly to apparatus for alternatively regulating two interdependent electrical quantities as determined by the value of one of them, such as current and voltage in a load circuit.

It is often desirable to limit any one of a plurality of interdependent or related electrical quantities to respective maximum values. Furthermore, it is often desirable to regulate one of these quantities to a constant value so long as the others are below their respective maximum values, and successively to transfer control as the other quantities reach their maximum values, so as to limit them to such values. As a two-quantity example, it is often desirable to maintain the current of an electric translating circuit, such as a series lighting circuit, constant over a given voltage range, while at the same time limiting maximum voltage in the circuit to a predetermined value.

In a limited regulating system embodying our invention, we accomplish limitation of a system which is normally regulated in accordance with the value of one electrical quantity by merely transferring control of the same regulating circuit to a related electrical quantity, the value of which it is desired to maintain above or below a predetermined limiting value. In providing such regulation of the limiting quantity to a predetermined constant value after transfer, as distinguished from simple, single-ended limiting, it is necessary that the transfer device be provided with a very small differential to ensure accurate control. For example, where regulation of both quantities is accomplished by comparison with a reference quantity of fixed value, and a selector relay responsive to the limiting quantity supplies a signal proportional to either one or the other quantity to the same signal amplifier input circuit, a selector relay or the like, responsive to the limiting quantity must have a very small differential in order to ensure its reversion to normal position as soon as the limiting quantity tends to return within its non-regulated range of values. It will be evident that in such a system where a limiting quantity is regulated to a constant value by the same circuit which regulates the normally regulated quantity, the requirement of low transfer differential is equally necessary, whether the limiting quantity be regulated at a maximum or at a minimum value.

A more specific object of our invention is to provide means for reducing substantially to zero the differential of a selector relay used to transfer a regulated apparatus from response to a normally regulated quantity in response to a limiting quantity.

In carrying out our invention in one form, we provide a signal responsive device connected to regulate an electric translating apparatus, such as a series lighting load circuit, to maintain substantially constant the value of a normally regulated electrical quantity of the circuit, such as current. In addition, we provide selector means responsive to value of a related electrical quantity, such as voltage, for transferring control of the signal responsive device to that other electrical quantity upon the occurrence of a limiting value thereof, so that the system thereafter regulates the limiting quantity to the limiting value. To preclude over-regulaion or under-regulation after transfer, we provide means for recalibrating the transfer relay following its transfer operation, so that its reverse operation will occur with only a very slight differential.

Our invention itself will be more fully understood, and its various objects and advantages further appreciated, by referring now to the following detailed specification taken in conjunction with the accompanying drawing, the single figure of which is a schematic circuit diagram of a voltage limited current regulating system embodying our invention.

Referring now to the drawing, we have illustrated an electric power translating apparatus comprising a direct current load circuit 1 supplied through a rectifier 2 from a three-phase alternating current supply including line conductors 3. In the line 3 in series with the rectifier 2 is connected a three-phase saturable core reactor 4 for controlling rectifier input voltage. It will, of course, be understood by those skilled in the art that the saturable core reactor 4, in controlling the rectifier input voltage, controls also the rectifier input and output current and the recifier output or load voltage, assuming that the load remains unchanged.

The impedance of the saturable core reactor 4 is controlled by a direct current saturating winding 5 connected in the output circuit of a signal responsive device 6, the input signal to which is responsive either to line current or load voltage, depending upon the position of a transfer or selector relay 7.

We have shown the signal responsive device 6 as a single phase, self-saturating magnetic amplifier supplied from a constant voltage source of alternating electric current supply represented by a pair of line conductors 8. The amplifier comprises a pair of reactor windings 9 and 10, bridge-connected in parallel circuit relation with each other through opposite arms of a rectifier bridge 11 and the amplifier output circuit including the reactor saturating winding 5. To increase the gain of the magnetic amplifier 6, a saturable reactor 12 is connected in series circuit relation therewith in the alternating current supply line 8, and provided with a saturating winding 12a in the output circuit of the amplifier. In order to improve the operation of the amplifier 6, a bleeder resistor 13 is connected in parallel circuit relation with the amplifier across the alternating current supply line 8. This high gain self-saturated magnetic amplifier including the saturable reactor 12, 12a is described and claimed in the copending application of one of us, Stuart P. Jackson, Serial No. 324,332, filed Dec. 5, 1952, and assigned to the same assignee as the instant application.

The input circuit of the magnetic amplifier 6 includes a single control winding 14 to which is supplied an adjustable reference signal voltage of constant value across a potentiometer 15 in differential relation with a selected signal voltage derived from the load circuit by means of the transfer relay 7. The reference signal voltage is established across the potentiometer 15 through a rectifier bridge 16, the input circuit of which is connected to the alternating current supply conductors 8 of fixed potential.

In series differential relation with the fixed reference signal voltage across the potentiometer 15, there is supplied in the amplifier input circuit a selected variable signal voltage proportional to either current or voltage in the load circuit 1. The current responsive signal voltage is derived from the alternating current line 3 through a current transformer 17 and a rectifier bridge 18, and supplied to the signal amplifier input circuit in series differential relation with the reference voltage across the potentiometer 15 through a normally closed contact 19 of the transfer relay 7. Similarly, the voltage responsive signal is derived from directly across the terminals of the load circuit 1, and supplied to the signal amplifier input circuit in differential relation with the reference voltage across the resistor 15 through a normally open contact 20 of the relay 7. It will, therefore, be evident that when the relay 7 is in its dropped-out position, a current responsive signal is supplied through the relay contact 19, and is compared with the reference signal, so that the output circuit of the amplifier controls the reactor saturating winding 5 to maintain the load circuit current constant. Similarly, when the relay 7 is in its picked-up position, a load voltage responsive signal is supplied to the signal amplifier input circuit and compared with the reference signal across the potentiometer 15, so that the amplifier output circuit controls the saturable reactor 4 to maintain load voltage constant.

The selector relay 7 is provided with an actuating winding 21 connected for response to the load voltage, in this case the limiting quantity, by connection of the actuating winding 21 across a portion of a potentiometer 22 connected across the terminals of the load 1. Connected in series circuit relation with the actuating winding 21, we provide a resistor 23 which is connected to be shunted by a normally closed contact 24 on the relay 7 when the relay is in its dropped-out position. Thus, it will be evident that upon the occurrence of a load voltage of a predetermined maximum value, the relay 7 picks up to transfer control of the amplifier 6 from the current signal supplied through the contact 19 to the voltage signal supplied through the contact 7. Upon pick-up of the relay 7, the actuating circuit of the relay is recalibrated by opening of the auxiliary contact 24, thereby to insert in series circuit relation with the actuating winding 21 the calibrating resistor 23. By insertion of this resistor 23, the signal voltage across the resistor 22 at which the relay 7 will drop out is increased, thereby decreasing the differential of the relay, so that the relay will not hold in on load voltages appreciably below the load voltage at which it picks up. It will, of course, be understood by those skilled in the art that the load voltage for drop-out must be somewhat below the load voltage for pick-up to ensure stable operation, but that for accurate control the differential between these voltages may be reduced to substantially zero.

It will now be understood by those skilled in the art that, if it is desired to limit in response to the occurrence of a minimum load voltage, rather than a maximum load voltage, this may be done by converting the contact 19 to a normally open contact and the contact 20 to a normally closed contact, so that in operation the relay 7 normally remains picked-up. The same relay actuating circuit shown will serve to ensure a small differential between drop-out of the relay upon occurrence of a predetermined minimum load voltage and subsequent pick-up when the load voltage tends to rise again above the predetermined minimum value.

Thus, while we have described only a preferred embodiment of our invention by way of illustration, many modifications will occur to those skilled in the art, and we, therefore, wish to have it understood that we intend in the appended claims to cover all such modifications as fall within the true spirit and scope of our invention.

What we claim as new and desire to secure by Letters Patent of the United States is:

1. In a regulating system for an electric translating apparatus, a signal responsive device having an input circuit and an output circuit, means for generating first and second electric signals variable in response to the values of interdependent variable electrical quantities related to said apparatus, a control device having two circuit controlling positions, said device when in one said position supplying said first electric signal to said input circuit and when in the other said position supplying said second electric signal to said input circuit, means connecting said output circuit to control the values of said electrical quantities thereby to maintain the selected input signal substantially constant, means responsive to one said electric signal for controlling actuation of said control device between said positions, and means controlled by said control device for reducing to substantially zero the differential between the actuating values of said one electric signal.

2. In a regulating system for an electric translating apparatus, a signal responsive device having an input circuit and an output circuit, means for generating first and second electric signals variable in response to the values of interdependent variable electrical quantities related to said apparatus, an electromagnetic relay having picked-up and dropped-out positions, said relay when in one said position supplying said first electric signal to said input circuit and when in the other said position supplying said second electric signal to said input circuit, means connecting said output circuit to control the values of said electrical quantities thereby to maintain the selected input signal substantially constant, meanes responsive to said second electric signal for actuating said relay to said picked-up position when said second electric signal attains a predetermined value, and calibrating means controlled by said relay for reducing to substantially zero the differential between the relay pick-up and relay drop-out values of said second electric signal.

3. In a regulating system for an electric translating apparatus, a signal responsive device having an input circuit and an output circuit, means for generating first and second electric signals variable in response to the values of interdependent variable electrical quantities related to said apparatus, an electromagnetic relay having picked-up and dropped-out positions, said relay when in said dropped-out position supplying said first electric signal to said input circuit and when in said picked-up position supplying said second electric signal to said input circuit, means connecting said output circuit to control the values of said electrical quantities thereby to maintain the selected input signal substantially constant, means responsive to said second electric signal for controlling actuation of said relay between said positions, and means controlled by said relay for reducing to substantially zero the differential between the relay pick-up and relay drop-out values of said second electric signal.

4. In a regulating system for an electric translating apparatus, a signal responsive device having an input circuit and an output circuit, means for generating an electric reference signal of constant value, means for generating first and second electric signals variable in response to the values of interdependent variable electrical quantities related to said apparatus, an electromagnetic relay having picked-up and dropped-out positions, said relay when in one said position supplying said first electric signal and said reference signal in differential relation to said input circuit and when in the other said position supplying said second electrical signal and said reference signal in differential relation to said input circuit, means connecting said output circuit to control the values of said electrical quantities thereby to maintain the selected input signal substantially constant, means responsive to said second electric signal for controlling the actuation of said relay between said positions, and means controlled by said relay for reducing to substantially zero the differential between the relay pick-up and drop-out values of said second electric signal.

5. In a regulating ssytem for an electric translating apparatus, an electric signal amplifier having an input circuit and an output circuit, means for generating first and second electric signals variable in response to the values of interdependent variable electrical quantities related to said apparatus, an electromagnetic relay including an actuating winding and having picked-up and dropped-out positions, said relay when in one said position supplying said first electric signal to said amplifier input circuit and when in the other said position supplying said second electric signal to said amplifier input circuit, means connecting said amplifier output circuit to control the values of said electrical quantities thereby to maintain the selected input signal substantially constant, means responsive to said second electric signal for energizing said relay actuating winding, a resistor connected in series circuit relation with said winding, and means controlled by said relay for shunting said resistor when said relay is in said dropped-out position, whereby said relay picks up and drops out at substantially the same value of said second electric signal.

6. In a regulating system for an electric translating apparatus, a signal amplifier having an input circuit and an output circuit, means for generating an electric reference signal of constant value, means for generating first and second electric signals variable in response to the values of interdependent variable electrical quantities related to said apparatus, an electromagnetic relay having picked-up and dropped-out positions, said relay when in said dropped-out position supplying said first electric signal and said reference signal in differential relation to said amplifier input circuit and when in said picked-up position supplying said second electric signal and said reference signal in differential relation to said amplifier input circuit, means connecting said amplifier output circuit to control the values of said electrical quantities thereby to maintain the selected input signal substantially constant, means responsive to said second electric signal for actuating said relay to said picked-up position when said second electric signal attains a predetermined value, and electric circuit means controlled by said relay for recalibrating said relay upon its actuation thereby to reduce to substantially zero the differential between the relay pick-up and drop-out values of said second electric signal.

7. In an apparatus for regulating an electric load circuit, an electric signal amplifier having an input circuit and an output circuit, means for generating first and second electric signals variable in response to the values of current and voltage respectively in said load circuit, an electromagnetic relay having picked-up and dropped-out positions, said relay when in one said position supplying said first electric signal to said amplifier input circuit and when in the other said position supplying said second electric signal to said amplifier input circuit, means connecting said amplifier output circuit to control the voltage applied to said load circuit thereby to maintain the selected input signal substantially constant, means responsive to said second electric signal for actuating said relay to said picked-up position when said second signal attains a predetermined value, and means including a resistor controlled by said relay for reducing to substantially zero the differential between the relay pick-up and drop-out values of said second electric signal.

8. In an apparatus for regulating an electric load circuit, a signal amplifier having an input circuit and an output circuit, means for generating an electric reference signal of constant value, means for generating a pair of electric signals variable in response to the values of current and voltage in said load circuit, an electromagnetic relay including an actuating winding and having picked-up and dropped-out positions, said relay when in said dropped-out position supplying one said variable electric signal and said reference signal in differential relation to said amplifier input circuits, and when in said picked-up position supplying the other variable electric signal and said reference signal in differential relation to said amplifier input circuit, means connecting said amplifier output circuit to control the voltage of said load circuit thereby to maintain the selected input signal substantially constant, means including a resistor for energizing said actuating winding in response to the value of said other electric signal, and means controlled by said relay for shunting said resistor when said relay is in said dropped-out position thereby to reduce to substantially zero the differential between the relay pick-up and drop-out values of said other electric signal.

9. In an apparatus for regulating an electric load circuit, a magnetic amplifier having an input circuit and an output circuit, means for generating an electric reference signal of constant value, means for generating first and second electric signals variable in response to the values of current and voltage respectively in said load circuit, an electromagnetic relay including an actuating winding and having picked-up and dropped-out positions, said relay when in said dropped-out position supplying said first electric signal and said reference signal in differential relation to said input circuit and when in said pick-up position supplying said second electric signal and said reference signal in differential relation to said input circuit, means connecting said amplifier output circuit to control the voltage of said load circuit thereby to maintain the selected input signal substantially constant, a coupling resistor connecting said actuating winding for a response to said second electric signal thereby to actuate said relay to said picked-up position when said second electric signal attains a predetermined value, and means controlled by said relay for shunting said resistor when said relay is in said dropped-out position thereby to reduce to substantially zero the differential between the relay pick-up and drop-out values of said second electric signal.

LESTER W. BURTON.
STUART P. JACKSON.

No references cited.